United States Patent [19]

Scott et al.

[11] 4,157,154
[45] Jun. 5, 1979

[54] METHOD FOR FORMING PATTERNS OF BRAZING ALLOY

[75] Inventors: James K. Scott, Anaheim; Theodore C. Schmidt, La Palma, both of Calif.

[73] Assignee: Hughes Aircraft Company, Culver City, Calif.

[21] Appl. No.: 853,693

[22] Filed: Nov. 21, 1977

[51] Int. Cl.² .............................................. B23K 1/04
[52] U.S. Cl. .................................. 228/140; 228/174; 228/211; 228/254
[58] Field of Search .............. 228/140, 174, 211, 170, 228/164, 249, 254, 203

[56] References Cited

U.S. PATENT DOCUMENTS

| | | | |
|---|---|---|---|
| 2,192,275 | 3/1940 | Melchior et al. | 228/140 X |
| 2,545,527 | 3/1951 | Maxwell | 228/254 X |
| 3,483,616 | 12/1969 | Shomphie | 228/203 X |
| 3,487,520 | 1/1970 | Lenhart et al. | 228/174 X |

*Primary Examiner*—C. W. Lanham
*Assistant Examiner*—Kenneth J. Ramsey
*Attorney, Agent, or Firm*—William H. MacAllister; Andra M. Finkel; Lewis B. Sternfels

[57] ABSTRACT

Brazing alloy on detailed aluminum parts is formed in an exact pattern of the joints to be brazed. An aluminum sheet having brazing alloy coated on one or both sides (e.g., a brazing sheet) is plated with electroless nickel and electrolytic copper which are etched by use of a photoresist mask into a mask which outlines the pattern. The brazing alloy coating is then chemically milled to form the exact pattern of the joints. Parts are then assembled and dip brazed to form the completed brazed unit.

8 Claims, 9 Drawing Figures

METHOD FOR FORMING PATTERNS OF BRAZING ALLOY

The government has rights in this invention pursuant to Contract No. DAAB07-76-C-0893 awarded by the Department of the Army.

BACKGROUND OF THE INVENTION

1. Field of the Invention

The present invention relates to a method for providing brazing alloy on detailed parts in an exact pattern of the joints to be brazed.

2. Description of the Prior Art

Brazing, as well as soldering, is based upon the close juxtaposition of metal pieces so that inter-atomic attraction will bind them together in permanent metallic bond when the metals to be joined are wetted with molten metal and cooled. The basic brazing and soldering techniques and equipment are similar for use in joining all metals, with variations depending upon the particular metal or combination of metals involved.

For aluminum and its alloys, for which the present invention has particular application, the general brazing procedure includes the following steps. The surfaces to be joined are cleaned, and spaced from one another a few thousandths of an inch. Brazing filler or solder is placed in the joint area of the part to be joined, a suitable flux is added and heat is applied. The flux reacts, displaces the oxide on the surface of the base metal, and shields the bare metal from contact with the air. In vacuum brazing, the flux is omitted. The brazing filler metal melts and is drawn into the joint by capillary attraction. The flowing brazing metal displaces the flux and wets the hot base metal which upon cooling, forms the joint. For further description of several brazing methods and relevant brazing information, reference is made to the "Aluminum Brazing Handbook", first edition, January 1971, published by The Aluminum Association, 750 Third Avenue, New York, N.Y. 10017, Library of Congress Catalog Card Number 71-159578.

For complicated joints, such as found in power dividers and waveguides, it is conventional to use brazing foil, which is cut and positioned between the joints at the time of assembly, and/or to place brazing wire and paste along each joint, or to use a brazing sheet with its entire surface clad with brazing alloy, even in places where the alloy is not needed. This latter use of cladding generally is unacceptable not only because excess brazing alloy results in waste but also, and more importantly, because the presence of the excess brazing alloy may prevent proper operation of the brazed device, whether its operation is electrical or otherwise. Generally, it is impossible, or at least impractical, to remove such excess brazing alloy. The former two techniques of utilizing foil and/or wire and paste require expensive hand fitting of the brazing alloy to the joints so that it is placed exactly and only where needed. Handling requires cleaning and degreasing of parts. Even in such instances of using brazing foil, for example, 100% electrical tests of each power divider is required due to manufacturing imperfections which arise from voids and skips occuring in unbrazed areas. Such voids and skips result from problems in placement of the brazing foil as well as from differences in the amount or thickness of the brazing material used. Such skips may result in corrosion from galvanic action if moisture enters the device.

SUMMARY OF THE INVENTION

The present invention overcomes and avoids these and other problems by defining the brazing alloy pattern as a precisely configured outline of the joints. It is preferred that the pattern be formed by masking and etching or chemical milling operations performed on one or both sides of a metal part on which a coating of the brazing alloy has been placed. After the coated part has been outlined, the part may be drilled, formed and machined as required prior to unit assembly and brazing.

It is, therefore, an object of the present invention to provide for a method of providing brazing alloy on detailed metal parts in an exact pattern of the joints to be brazed.

Another object is to provide for simplicity in forming such exact patterns.

Another object is to form such brazing patterns with a minimum of time and cost, as well as complexity of assembly.

Another object is to provide for increased reliability and consistency, characterized as repeatability in processing, with a minimum of defect in the brazed joints.

Another object is to provide for reduced testing of the finished product following the completion of brazing.

Another object is to provide a means by which close tolerances of brazed joints can be achieved at a lower cost than previously obtainable.

Another object is to provide for enhanced surface finish, brazed fillet size and brazed joint quality of the completed article.

Another object is to provide for such a method which is amenable for use in production line operations.

Another object is to achieve complex and accurately etched patterns with relative ease and without extensive handling.

Another object is to facilitate easy cleaning of assemblies to be brazed.

Other aims and objects, as well as a more complete understanding of the present invention, will appear from the following explanation of an exemplary embodiment and the accompanying drawings thereof.

BRIEF DESCRIPTION OF THE DRAWINGS

FIG. 9 is a cross-sectional view of a joint between assembled parts screwed together prior to brazing.

DESCRIPTION OF THE PREFERRED EMBODIMENTS

Although the invention was devised to overcome problems particularly arising from brazing of aluminum parts, it is to be understood that it is as useful for any metals which are to be brazed, wherever photoresist and similar etching is possible. Therefore, any metals other than aluminum, whose surface or surfaces are or can be clad with brazing alloy, are contemplated as coming within the purview of the present invention. Examples of such other metals and claddings include copper with a silver braze and stainless steel with a nickel or silver braze.

Figure 1:
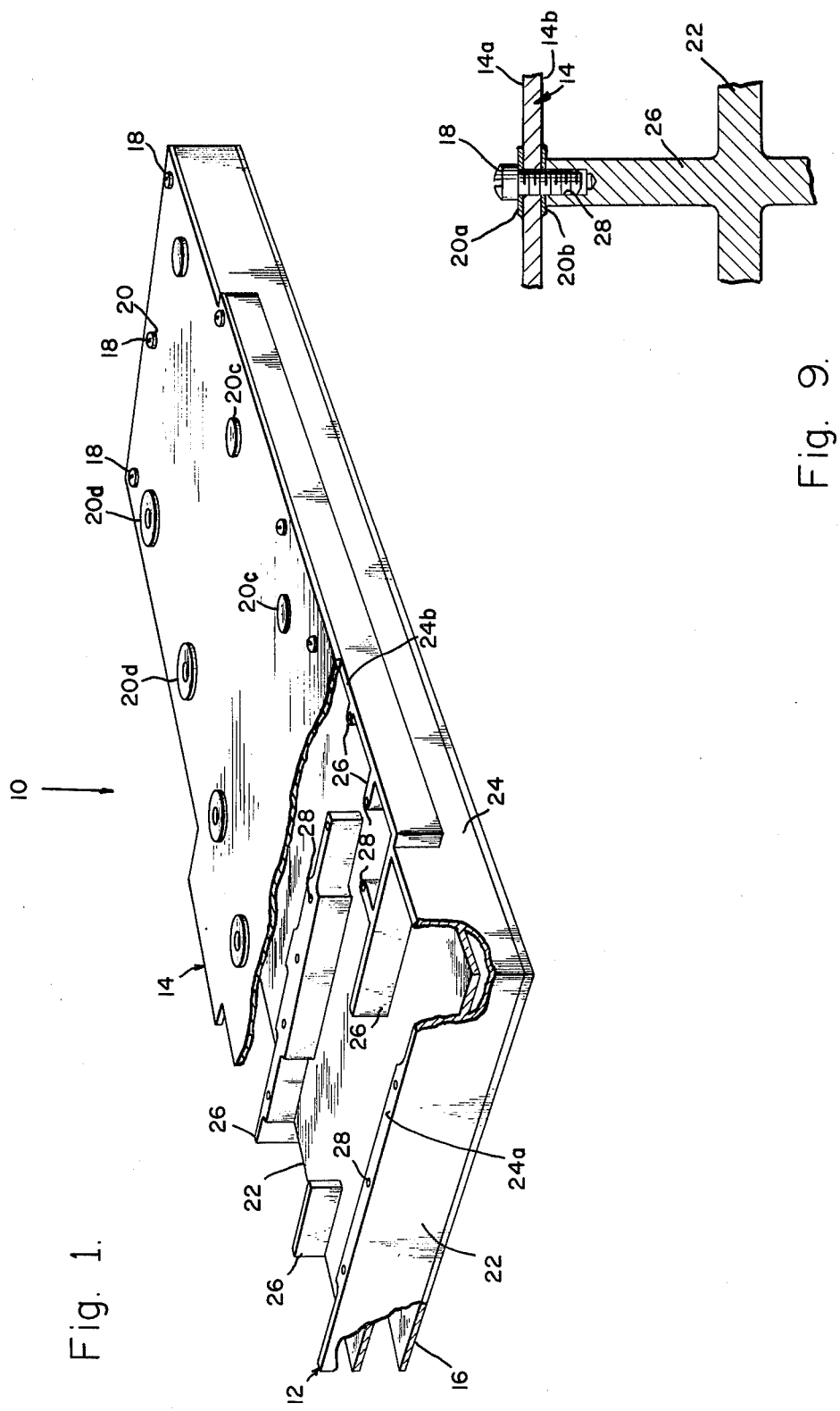
FIG. 1 is a perspective view, with portions cut away therefrom, of a completed brazed article.

Referring now to FIG. 1, a finished article 10 is shown as representing a part of a power divider. Article 10 includes a center section 12 and a pair of cover plates 14 and 16 screwed and brazed to center section 12 to form a unitary structure, a few machine screws 18 being representatively shown. Brazements 20, 20c and 20d, formed on plate 14 for joining screws 18, flanges and castings to plate 14, are also illustrated.

Center section 12 comprises a support 22 from which a side 24 and partitions 26 extend in both directions towards cover plates 14 and 16. In the sides and partitions are threaded holes 28 for receiving screws 18.

Figure 2:
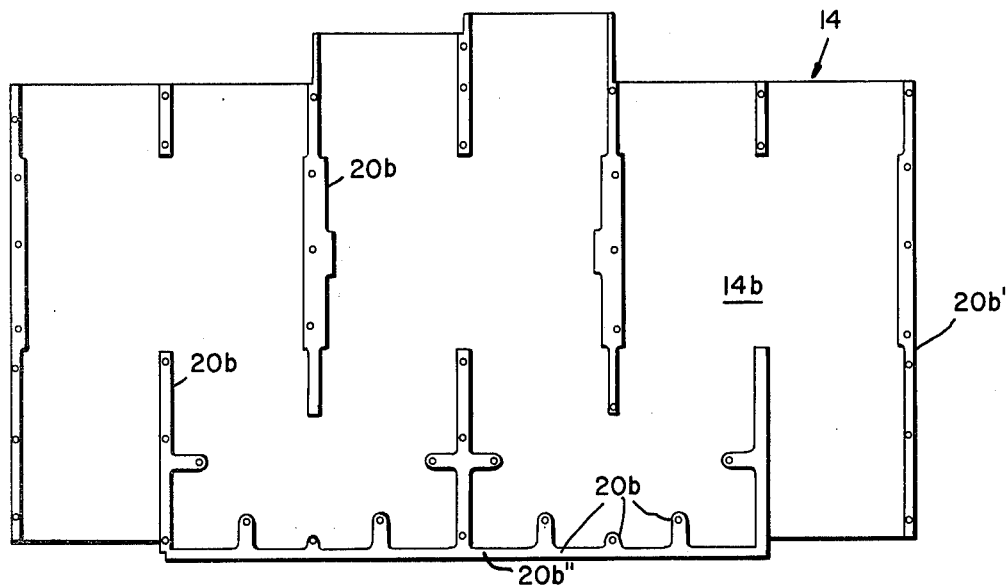
FIG. 2 is a plan view of one side of the sheet having a pattern of brazed alloy placed thereon in accordance with the teachings of the present invention.

In FIGS. 2 and 9, the prebrazed joints comprise pattern material 20a on outer surface 14a of cover plate 14 in contact with the head of screw 18 (see FIG. 9) and pattern material 20b on inner surface 14b of plate 14 between cover plate 14 and partition 26 (FIG. 9). In order to facilitate a ready correspondence between cover plate 14 and FIGS. 1 and 2, the particular brazements 20b' at the right side of cover plate 14, as shown in FIG. 2, form the brazed joint with top edge 24a of center section side 24 as shown in FIG. 1, and brazement 20b'' forms the brazed joint with surface 24b of another side 24 of center section 12.

The process for making article 10 and for obtaining the desired brazing alloy patterns 20a and 20b will now be described with particular reference to FIGS. 3-8.

Figure 3:
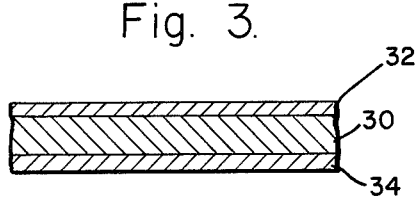
FIGS. 3-8 show views of a representative section taken through the plate of FIG. 2 for illustrating stages in performing the method of the present invention.
Figure 6:
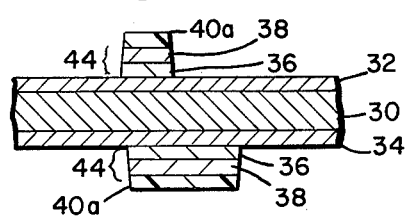

FIG. 3 depicts a portion of an aluminum sheet 30 which is to be used, for example, in the preparation of cover plate 14. Placed on aluminum sheet 30 are coatings or claddings 32 and 34, respectively on the inner and outer sides of the sheet which are to form, respectively, inner and outer sides 14b and 14a of cover 14. Claddings 32 and 34 are of a conventional aluminum brazing material and may be placed on aluminum sheet 30 by a vendor or otherwise, as desired.

Figure 4:
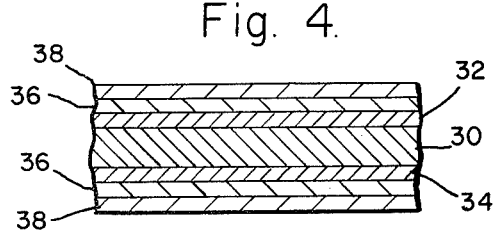

As shown in FIG. 4, layers of nickel 36 and copper 38 are formed both on top of claddings 32 and 34 in any conventional manner, such as by an electroless process for the nickel and an electolytic process for the copper.

Figure 5:
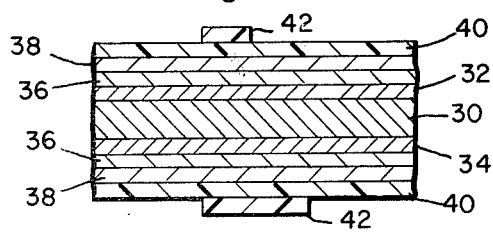

A layer of photoresist 40 is then placed on copper layers 38. As illustrated in FIG. 5, masks 42, constructed as artwork configured as the desired joint patterns, are placed over photoresist layers 40. Photoresist layers 40 are then exposed through masks 42 and developed. Removal of the undesired photoresist material results in photoresist masks 40a representatively shown in FIG. 6. Using these photoresist masks 40a, the exposed copper and nickel underplate is then stripped in nitric acid, for example, to form nickel-copper masks 44, also shown in FIG. 6.

Figure 7:
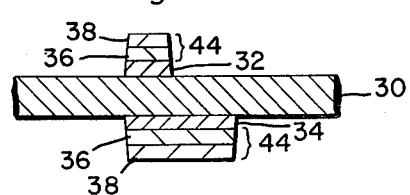

Using the nickel-copper masks 44, cladding layers 32 and 34 are selectively etched in an alkaline etching solution to result in the configuration depicted in FIG. 7. Thereafter, nickel-copper masks 44 are removed or stripped with nitric acid solution and any remaining photoresist is removed with a suitable solvent stripper, such as methyl ethyl chloride. The result is shown in FIGS. 8 and 2.

The multiple mask process described above is particularly relevant to aluminum processing. Because the aluminum alkaline etch solution is very caustic, it will remove conventional photoresist materials. However, copper is not significantly affected by such an alkaline etch solution; therefore, a nickel-copper mask is employed. While nickel and copper and nitric acid are described respectively as the materials of the mask and the nickel-copper mask stripper, any other mask and stripper materials may be used as is desired so long as they do not deleteriously affect the cladding or underlying aluminum.

Figure 8:
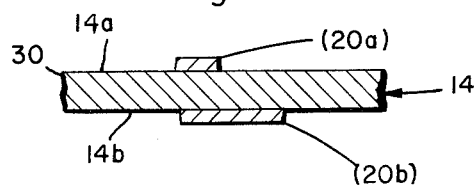

Sheet 30 with its etched cladding 32 shown in FIGS. 2 and 8 is inspected to insure that they conform with specification. Thereafter, the sheet is trimmed, holes are drilled therethrough, and only final machining operations are performed.

Center section 12 (see FIG. 1) may be formed by any conventional process such as by machine milling of plate stock or casting to form support 22, sides 24 and partitions 26. After holes 28 are drilled and tapped therein, covers 14 and 16 are screwed onto center section 12 with screws 18. Any castings and flanges are positioned in place on specially formed braze alloy patterns 20c and 20d, respectively, or elsewhere, as desired. The flanges to be secured to cover 14 at braze alloy pattern 20d may have coaxial, mechanical or other connections secured thereto.

The assembled whole is then completed by brazing it by means of conventional processes, such as by dip brazing, vacuum brazing or otherwise. Thereafter, completed article 10 is integrated into the system for which it is intended.

The present invention has been compared with respect to the former method utilizing brazing foil. In terms of labor and material, the savings in unit cost in each case is approximately 12½ times. For example, in an antenna system requiring nine power dividers, the former method required approximately 625 hours to form all power dividers while, using the present inventive method, only 50 hours were required for the otherwise same power dividers. In addition, it was necessary to perform a 100% electrical test of each power divider fabricated by the old brazing foil method because of the above-noted manufacturing imperfections. As a result of utilizing the present invention, the reliability and consistency and, therefore, repeatability of manufacturing, enabled this electrical testing to be reduced to a first article unit check. Thereafter, only a system check was required. All unit checks beyond first article inspection were dispensed with. It is obvious, therefore, that the invention results in brazed joints of excellent quality at significantly reduced cost.

In addition, in the case of an RF power divider for the above antenna system, there was a requirement for a minimum fillet radius (about 0.03 inches maximum) in the corner of the joint. The present invention was the only method for controlling such a minimum fillet radius. Also, it was not possible to form a quality butt joint with satisfactory results using the former foil method. Thus, an expensive register fit was required.

Although the invention has been described with reference to a particular embodiment thereof, it should be realized that various changes and modifications may be made therein without departing from the spirit and scope of the invention.

What is claimed is:

1. A method for forming brazed joints between component parts comprising the steps of utilizing a brazing alloy coating on at least one of the parts, removing the brazing alloy from selected areas on the coated part for providing a joint pattern configured as the brazed joint, and joining and brazing the parts together.

2. A method for forming brazed joints between component parts comprising the steps of utilizing a brazing alloy coating on at least one of the parts, masking the part with a mask configured as the joint pattern and chemically etching the brazing alloy from the masked coated part, and joining and brazing the parts together.

3. The method of claim 2 wherein said brazing step comprises the step of dip brazing the joined parts.

4. A method for forming brazed joints between component parts comprising the steps of utilizing a brazing alloy coating on an aluminum sheet, respectively adhering layers of nickel, copper and photoresist into the coated aluminum sheet, placing a first mask configured as the joint pattern onto the photoresist, exposing the masked photoresist, developing and removing photoresist as exposed for providing a photoresist mask on the copper, etching the copper and nickel through the photoresist mask for providing a nickel-copper mask on the brazing alloy, etching the brazing alloy through the nickel-copper mask for providing the joint pattern, removing the nickel-copper mask, and joining and brazing the parts together.

5. The method of claim 4 wherein nitric acid is used in said copper and nickel etching step.

6. The method of claim 4 wherein and alkaline etching solution is used in said brazing alloy etching step, the alkaline etching solution also being capable of removing the photoresist.

7. The method of claim 4 in which another one of the parts other than the coated aluminum sheet comprises aluminum stock, and further comprising the step of chemically milling the aluminum stock for forming a support with sides and partitions extending therefrom in which the sides and partitions have a configuration matching the joint pattern.

8. The method of claim 7 further comprising the prejoining and prebrazing steps of drilling mating holes in the aluminum sheet having the joint pattern therein and in the sides and partitions of the milled aluminum stock, with brazing alloy after said removing step remaining at the holes in the aluminum sheet, and in which said joining step comprises the step of placing screws through the holes in the aluminum sheet and into threaded enagement with the holes in the sides and partitions, and said brazing step includes the step of brazing the joints together and the screws to the aluminum sheet.

* * * * *